United States Patent
Sakagami

(12) 
(10) Patent No.: US 6,636,827 B2
(45) Date of Patent: *Oct. 21, 2003

(54) FOREIGN-MATTER DETECTOR AND FOREIGN-MATTER DETECTING SYSTEM

(75) Inventor: Yoshiaki Sakagami, Shiga (JP)

(73) Assignee: Ishida Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,012

(22) Filed: Apr. 1, 1999

(65) Prior Publication Data

US 2003/0144820 A1 Jul. 31, 2003

(30) Foreign Application Priority Data

Apr. 7, 1998 (JP) .......................................... 10-094178

(51) Int. Cl.[7] ............................................... G01N 27/72
(52) U.S. Cl. .......................... 702/193; 702/33; 702/38; 702/175; 702/183; 702/189
(58) Field of Search ................. 702/33–36, 38, 702/57, 65, 72, 152, 175, 183, 189, FOR 103, FOR 104, FOR 123, FOR 124, FOR 125, FOR 134, FOR 170, FOR 171; 250/559.45, 223 R; 356/349, 345, 359, 360, 237.3, 237.4, 351

(56) References Cited

U.S. PATENT DOCUMENTS 3,775,556 A * 11/1973 Nagamatsu ................. 178/6.8
4,094,325 A * 6/1978 Stoffers et al. ............. 131/21 R
4,137,155 A * 1/1979 Clin et al. ................... 209/134

(List continued on next page.)

FOREIGN PATENT DOCUMENTS

| EP | 0 308 073 B1 | 3/1989 | .......... G01N/27/72 |
| EP | 0 353 035 A2 | 1/1990 | .......... G01V/3/10 |
| JP | 59082727 A | * 5/1984 | .................. 356/398 |
| JP | 3150452 | * 6/1991 | |
| JP | 2000274388 | * 10/2000 | |
| JP | 2001153092 | * 6/2001 | |
| JP | 2001299288 | * 10/2001 | |

OTHER PUBLICATIONS

Patent Abstracts of Japan, vol. 018, No. 436 (P–1786) Aug. 15, 1994.
Patent Abstracts of Japan, vol. 017, No. 512 (P–1613) Sep. 14, 1993.
Patent Abstracts of Japan, vol. 018, No. 018 (P–1763) Jan. 12, 1994.
Patent Abstracts of Japan, vol. 018, No. 478 (P–1796) Sep. 6, 1994.

Primary Examiner—Marc S. Hoff
Assistant Examiner—Carol S. W. Tsai
(74) Attorney, Agent, or Firm—Staas & Halsey LLP

(57) ABSTRACT

A foreign-matter detector for detecting foreign matter contained in an article P transported between a transmitter (17) and a receiver (18). The detector (1) includes a signal extractor (2) for extracting a signal (e) having a predetermined phase difference relative to a transmitted signal (a) from the transmitter (17), based on a phase of the transmitted signal (a) from the transmitter (17) and the received signal (b) from the receiver (18), a specific value setting unit (25) for setting, through an external input operation, a specific value for the level of the extracted signal (e) which is outputted from the signal extractor (2) and which is attributable to the article (P) free from foreign matter to be detected, and a level adjusting circuit (24) for adjusting the signal extractor (2) or the receiver (18) to cause the level of the extracted signal (e) attributable to the article itself to assume the specific value inputted. A foreign-matter detecting system is also provided which makes use of the foreign-matter detector.

19 Claims, 3 Drawing Sheets

U.S. PATENT DOCUMENTS

| | | | |
|---|---|---|---|
| 4,251,555 A | * | 2/1981 | Kroenig .................... 426/231 |
| 4,325,027 A | * | 4/1982 | Dykstra et al. ............ 324/326 |
| 4,330,689 A | * | 5/1982 | Kang et al. ........... 179/15.55 R |
| 4,675,497 A | * | 6/1987 | Pearl et al. .......... 219/121 LG |
| 4,841,571 A | * | 6/1989 | Kage .......................... 380/31 |
| 4,895,174 A | * | 1/1990 | Henderson et al. ........ 131/110 |
| 4,926,170 A | * | 5/1990 | Beggs et al. ............... 340/904 |
| 5,045,789 A | * | 9/1991 | Inoue et al. ............... 324/225 |
| 5,194,709 A | * | 3/1993 | Ichikawa et al. .......... 219/109 |
| 5,304,927 A | | 4/1994 | Thomas et al. |
| 5,363,187 A | * | 11/1994 | Hagiwara et al. .......... 356/237 |
| 5,383,546 A | * | 1/1995 | Mulder ...................... 194/203 |
| 5,476,108 A | * | 12/1995 | Dominguez et al. ........ 131/108 |
| 5,529,169 A | * | 6/1996 | Wilbur et al. ............... 209/576 |
| 5,663,569 A | * | 9/1997 | Hayano ................. 250/559.45 |
| 5,684,583 A | * | 11/1997 | Abe et al. ................... 356/335 |
| 5,691,640 A | | 11/1997 | King |
| 5,733,592 A | * | 3/1998 | Wettstein et al. ........... 426/416 |
| 5,742,386 A | * | 4/1998 | Nose et al. ................. 356/237 |
| 6,003,681 A | * | 12/1999 | Wilbur et al. ............... 209/639 |
| 6,005,660 A | * | 12/1999 | Yoshida et al. .......... 356/237.3 |
| 6,018,391 A | * | 1/2000 | Yoshida ..................... 356/349 |
| 6,081,324 A | * | 6/2000 | Yagita et al. ............... 356/237 |

* cited by examiner

FOREIGN-MATTER DETECTOR AND FOREIGN-MATTER DETECTING SYSTEM

BACKGROUND OF THE INVENTION

1. Field of the Invention

The present invention relates to a detector, and a system utilizing the foreign-matter detector, for detecting the presence or absence of foreign matter in articles.

2. Description of the Prior Art

In general, the foreign-matter detector is known as an equipment for detecting the presence or absence of foreign matter such as, for example, metal in articles which ought not to contain such foreign matter. This foreign-matter detector is generally comprises a transmitter, a receiver, a signal extractor for extracting a received signal having a predetermined phase difference relative to a transmitted signal from the transmitter, based on the phase of the transmitted signal from the transmitter and the received signal from the receiver, while an article to be inspected is passed through the magnetic field generated by the transmitter, and a determining means for comparing an extracted signal from the signal extractor with a predetermined determination level and for determining the presence or absence of foreign matter in the article based on a result of the comparison.

In this foreign-matter detector, since an article free from foreign matter has an effect (a product effect) that affects the magnetic field, it often occur that such article reacts to the foreign-matter detector to eventually generate the extracted signal of a high level having the predetermined phase difference. For this reason, to avoid any possible erroneous detection caused by the article itself, it is necessary to set, for each type or kind of articles, the level of the extracted signal, which is attributable to the article itself, by passing, before the foreign-matter detector is actually operated, the article free from the foreign matter and adjusting the detection sensitivity of the receiver so that the detector will not react. In such case, to assuredly avoid the erroneous detection which would result from the product effect, setting of the extracted signal attributable to the article itself has been carried out by setting the detection sensitivity at the phase of such extracted signal to a relatively low value, that is, reducing the detection sensitivity, to attain a predetermined fixed value lower than the level of determination of the foreign matter. The difference between the level of the extracted signal attributable to the article itself and the determination level represents a sensitivity margin.

However, even though compositions of the articles to be inspected remain the same, the value of the extracted signal attributable to the article varies depending on the characteristics of the article, for example, change in shape and stability of the article during transportation thereof, and therefore, it has often occurred that the sensitivity margin referred to above has to be increased or decreased. By way of example, in the event that a change of the extracted signal attributable to the article itself is small, the level of the extracted signal can be set to a level higher than the above described fixed value to thereby decrease the sensitivity margin, since there is little possibility that the erroneous detection in which the article free from foreign matter is determined as containing foreign matter would occur. When the level of the extracted signal attributable to the article itself is increased, the sensitivity of detection of the foreign matter will increase, accompanied by a corresponding increase of the performance of the foreign-matter detector.

In such case, it has been a general practice that the operator performs a job of manually changing the reading of a sensitivity setting indicator (for example, 0 to 999) of the foreign-matter detector to thereby adjust the detection sensitivity so that a desired extracted signal can be obtained.

With the prior art foreign-matter detector of the type discussed above, adjustment of the detection sensitivity is required frequently each time the reading of the detection sensitivity is changed accompanying passage of the article through the foreign-matter detector and, therefore, a relatively long time is required to set the extractor signal to a desired level. Also, it is often required to properly adjust the phase of the extract signal depending on the characteristics of the article.

SUMMARY OF THE INVENTION

Accordingly, the present invention has been devised with a view to substantially eliminating the above discussed problems inherent in the prior art foreign-matter detector and is intended to provide an improved foreign-matter detector and an improved foreign-matter detecting system in which the level of the extracted signal attributable to the article to be inspected can easily be set.

To this end, the present invention provides a foreign-matter detector for detecting foreign matter contained in an article transported between a transmitter and a receiver. This foreign-matter detector comprises a signal extractor operable, based on the phase of a transmitted signal from the transmitter and a received signal from the receiver, to extract the received signal having a predetermined phase difference relative to the transmitted signal, a specific value setting unit operable in response to an external input to set to a specific value the level of the extracted signal fed from the signal extractor in connection with an article free from foreign matter to be detected, and a level adjusting circuit for adjusting the signal extractor or the receiver to adjust the level of the extractor signal, attributable to the article itself, to the specific value when the article free from the foreign matter to be detected is transported.

With the foreign-matter detector according to the present invention, when the specific value for the level of the extracted signal attributable to a desired article itself is inputted, the signal extractor or the receiver can be automatically adjusted to assume the specified value for the article itself and, therefore, the setting of the level of the extracted signal attributable to the article can easily be accomplished.

Preferably, the specific value setting unit referred to above includes an item input unit for inputting kinds of articles, a storage means storing a specific value for the level of the extracted signal attributable to each kind of the articles, and a specific value selecting means for reading out the specific value corresponding to the kind of the article inputted and for outputting the specific value to the level adjusting circuit. Accordingly, merely by inputting the kind of the article, a receiving circuit of the receiver or a transmitting circuit of the transmitter can be automatically adjusted so that the level of the extracted signal attributable to the desired article itself can assume the specific value and, therefore, the setting of the level of the extracted signal attributable to the article itself can further easily be accomplished.

Again preferably, the level adjusting circuit is operable to perform at is least adjustment of the detection sensitivity, out from adjustment of the phase of the transmitted signal in the signal extractor and adjustment of the detection sensitivity in the receiver, to thereby adjust the level of the extracted signal attributable to the article itself. In such case, in a preferred embodiment of the present invention, the receiver comprises a pair of receiving coils connected parallel to each other and disposed at respective locations where they receive an equal amount of magnetic fluxes generated by the transmitter, and a differential amplifier for amplifying a difference between respective voltages generated in the receiving coils. The amplification factor of the differential amplifier can be adjusted by the level adjusting circuit.

The present invention also provides a foreign-matter detecting system which comprises a transport conveyor for transporting successively articles which may be a food product, and the foreign-matter detector of the type referred to above for detecting the presence or absence of foreign matter contained in the article being transported by the conveyor. In this system, the presence or absence of foreign matter in the article can be detected while it is transported by the conveyor.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
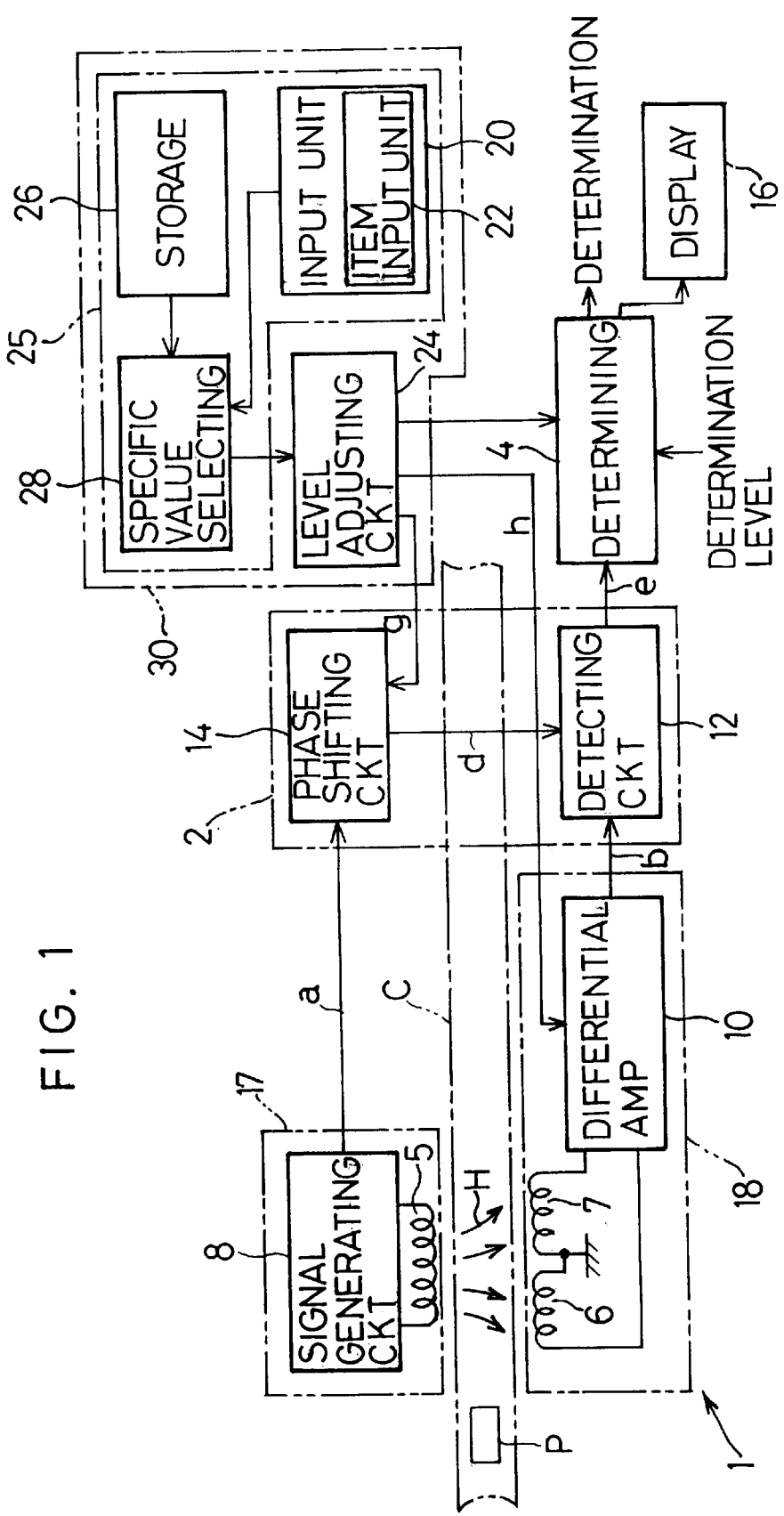
FIG. 1 is a circuit block diagram showing a foreign-matter detecting system according to a preferred embodiment of the present invention.

Referring to FIG. 1 showing a foreign-matter detecting system embodying the present invention, the system shown therein comprises a foreign-matter detector 1 disposed in a production line including a transport conveyor C for successively transporting articles P for the production of, for example, food products. With this foreign-matter detector 1, the presence or absence of foreign matter in the articles P being successively transported by the conveyor C can be detected.

The foreign-matter detector 1 comprises a transmitter 17 including a transmitting coil 5 and a signal generating circuit 8; a receiver 18 including receiving coils 6 and 7 and a differential amplifier 10; a signal extractor 2 for extracting a signal e having a predetermined phase difference relative to a transmitted signal a, based on the phase of the transmitted signal a from the signal generating circuit 8 of the transmitter 17 and a received signal b from the differential amplifier 10 of the receiver 18; and a determining means 4 for comparing the signal level of the extracted signal e with a determination level and for determining the presence or absence of foreign matter in the article P based on a result of the comparison. The transmitting coil 5 and the pair of the receiving coils 6 and 7 are disposed on respective sides of the transport path defined by the transport conveyor C in face-to-face relation with each other.

Figure 2:
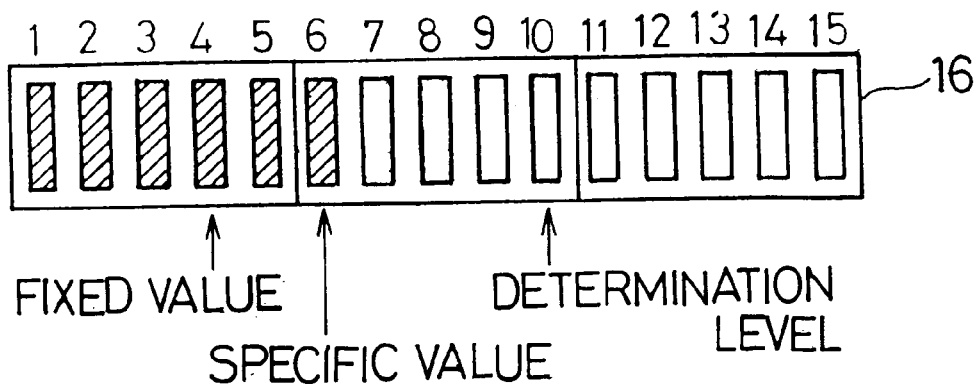
FIG. 2 is a diagram showing levels of extracted signals attributable to articles, which signals are generated from a signal extractor used in a foreign-matter detector employed in the system of FIG. 1.

As shown in FIG. 2, the result of comparison performed by the determining means 4 is displayed by a graphic display means 16 in the form of a bar graph having a plurality, for example, fifteen bars representing different levels that can be attained by the extracted signal e. By way of example, assuring that the fifteen bars are given number 1 to number 15 as shown, and that the determination level is assigned number 10, when the bars bearing respective numbers 10 to 15 are turned on, it indicates that the article P having passed between the transmitter 17 and the receiver 18 contains foreign matter.

The signal generating circuit 8 of the transmitter 17 shown in FIG. 1 supplies a predetermined exciting current to the transmitting coil 5 to cause the latter to generate a magnetic field H of the same frequency as that of a reference signal (the transmitted signal a) of a predetermined frequency. The paired receiving coils 6 and 7 are connected parallel to each other and are disposed at respective locations where those coils 6 and 7 can receive an equal amount of magnetic fluxes in the magnetic field H developed by the transmitting coil 5, whereby as the article P passes across the magnetic field H, the magnetic fluxes intersecting the receiving coils 6 and 7 will become out of equilibrium and a difference will therefore arise between respective voltages induced in the receiving coils 6 and 7. A voltage signal indicative of the difference between the induced voltages is subsequently inputted to and amplified by the differential amplifier 10 which then outputs the received signal b.

The signal extractor 2 includes a phase shifting circuit 14 for outputting a phase shifted signal d corresponding to the transmitted signal a from the signal generating circuit 8 which has been shifted in phase according to a phase shifting data inputted from a level adjusting circuit 24 as will be described later, and a detecting circuit 12 for detecting a synchronization between the differential signal b from the differential amplifier 10 and the phase shifted signal d.

The foreign-matter detector 1 also comprises an automatic level adjusting device 30 for automatically adjusting, before or during the run of the production line, the level of the extracted signal e attributable to the article itself which is detected by the detecting circuit 12 during passage of the article free from foreign matter to be detected, from a fixed value (for example, level 4) adjusted to a relatively low value before the run of the production line so as to increase or reduce the sensitivity margin.

The automatic level adjusting device 30 includes an input means 20 such as, for example, a touch screen panel having an item input unit 22 through which kinds of articles P can be inputted; a storage means 26 storing specific values for the level of the extracted signal e attributable to the particular article for each kind of the articles P, phase data each representative of a proper phase for the particular article itself, a specific value selecting means 28 for reading from the storage means 26 one of the specific values appropriate to the particular kind of the article P inputted and outputting the read specific value to the level adjusting circuit 24; and the level adjusting circuit 24 for adjusting the amplification factor of the differential amplifier 10 of the receiver 18 and the amount of phase shift performed by the phase shifting circuit 14 of the signal extractor 2 so that the level of the extracted signal e attributable to the article itself can attain the specific value inputted. The input means (the item input unit 22), the storage means 26 and the specific value selecting means 28 altogether constitute a specific value setting unit 25 for setting a specific value by means of an external input operation. An adjustment command signal outputted from the level adjusting circuit 24 to the signal extractor 2 and the receiver 18 in correspondence with the specific value for the level of the extracted signal e attributable to the article itself includes a phase adjusting signal g for adjusting the signal extractor 2 to a phase appropriate to the particular kind of the article P and a sensitivity adjusting signal h for adjusting the sensitivity of the receiver 18. The phase data necessary to generate the phase adjusting signal g can be empirically obtained by conducting a series of experiments and can be read from the storage means 26.

Figure 3:
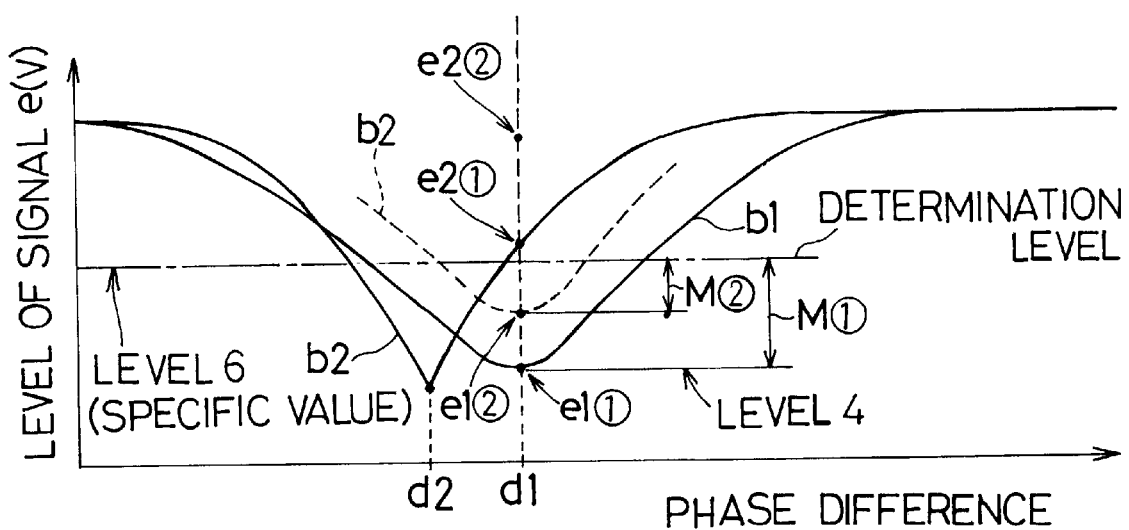
FIG. 3 is a characteristic diagram showing the relationship between the phase difference and the extracted signal.

The operation of the foreign-matter detecting system embodying the present invention will now be described. The level (voltage) of the received signal b from the differential amplifier 10 varies with the difference in phase between the transmitted signal a and the received signal b as shown in FIG. 3. A received signal b1 attributable to the article P itself free from foreign matter and a received signal b2 attributable to the article P containing foreign matter have different phases at dip points d1 and d2 which represents the minimum value, respectively. The level of the received signal b2 does not vary with the size of the foreign matter in a saturated condition, but varies with the size of the foreign matter in a non-saturated condition. Accordingly, the detecting circuit 12 sets a detecting phase at, for example, the dip point d1 at which the level of the received signal b1 is minimum, in order to increase the precision with which the presence or absence of the foreign matter can be detected. In view of this, the received signals b1 and b2 exhibiting a phase difference d1 can be extracted as an extracted signal e1, e2. Before the run of the production line, level of the extracted signal e1 attributable to all of the articles P is set to a fixed value 4 at which the detection sensitivity is relatively low, so that any possible erroneous detection resulting from the received signal b1, that is, the product effect can be assuredly avoided. The extracted signal e1 at this time is shown by reference character e1① in FIG. 3. The level thereof is "4". The determination level with which the presence of the foreign matter in the article is detected is a fixed value for all kinds of the foreign-matter detectors. Accordingly, the sensitivity margin M① which corresponds to the difference between the extracted signal e1① of the level "4" and the determination level is relatively large.

Starting from this condition, the detection sensitivity is changed. By way of example, the characteristic of the article P which is in the form of a food product may vary depending on whether the article P is placed on the conveyor in a vertical position or whether the article P is placed on the conveyor in a horizontal position and the product effect may therefore vary. However, where a condition is available that the article P can be transported by the conveyor C while assuming any predetermined posture on the conveyor C, the possibility of occurrence of the erroneous detection is low even though the detection sensitivity is increased. In view of this, in the illustrated embodiment, with respect to the article P, before or during the run of the production line, the extracted signal e1 attributable to the article itself is set to have a level higher than the fixed value 4 and to the level 6 shown in FIG. 3 which is lower than the determination level 10, to thereby reduce the sensitivity margin. The extracted signal available at this time is shown by reference character e1②, the sensitivity margin being shown by M②.

Phase data representative of the specific values for the level of the extracted signal e1 attributable to the article with due regards taken in consideration of the characteristic of each kind of the articles P and the proper phase for the particular article (in the illustrated embodiment, the phase d1 at the above described dip point) are beforehand stored in the storage means 26 shown in FIG. 1. In the case of the article P discussed above, the specific value 6 is stored therein.

In the first place, the article P is inputted through the item inputting unit 22 of the input means 20. The specific value selecting means 28 then reads from the storage means 26 one of the specific values, that is, the specific value 6 which corresponds to the article P so inputted, and outputs it to the level adjusting circuit 24. Then, the level adjusting circuit 24 operates to adjust the extracted signal attributable to the article and outputted from the detecting circuit 12 to assume the level represented by the specific value 6. In other words, the phase data of the article P (data indicative of the dip point phase d1) is read from the storage means 26 and outputted to the phase shifting circuit 14 where the transmitted signal from the signal generating circuit 8 is changed and set to a predetermined phase d1 that properly corresponds to the article P. Then, the level adjusting circuit 24 calculates the ratio of the level of the specific value 6 relative to the level 4 of the fixed value, that is, 6/4=1.5, to provide a sensitivity adjusting signal which is subsequently outputted to the differential amplifier 10. In response to this sensitivity adjusting signal, the amplification factor of the differential amplifier 10 is increased to a value 1.5 times to thereby change the detection sensitivity to a value 1.5 times. In this way, change is made to the phase at the time the article P assumes the predetermined posture and the detection sensitivity is set to a value higher than the detection sensitivity afforded when the level is at the fixed value 4. Once this occurs, the level of the extracted signal e1 attains a value e1② of the level 6 which is 1.5 times the value e1①. The sensitivity margin relative to the level 6 is of a value M② that is smaller than the value M①. At this time, the level of the extracted signal e2② attributable to the article P containing foreign matter attains a value which is 1.5 times e2①. The received signal b1 generated when e1① is the level 6 is shown by the broken line in FIG. 3. As a result that the sensitivity margin has reduced, the level of the extracted signal e2 exceeds the determination level even when a small piece of foreign matter is contained in the article, thus resulting in increase of the detection precision.

Although in the illustrated embodiment the level of the specific value of the extracted signal attributable to the article itself is increased from the level of the fixed value, it may be conversely decreased where the sensitivity margin is required to be more increased such as occurring when the article is prone to change in shape or the posture of the article is unstable.

Also, where the production deals with the articles of a fixed kind, but have varying sizes, only the amplification of the differential amplifier 10 may be carried out without the phase adjustment of the phase shifting circuit being performed by the level adjusting circuit 24. Also, in the case where the phase difference of the extracted signal may change, but the level of the extracted signal does not change so much, even though the kind of articles changes, only the phase adjustment of the phase shifting circuit 14 may be carried out without the amplification factor of the differential amplifier 10 being adjusted.

Thus, when the specific value for the level of the extracted signal attributable to a desired article itself is inputted by inputting the kind of the article P, the differential amplifier 10 of the receiver 18 or the phase shifting circuit 14 of the signal extractor 2 can be automatically adjusted to assume the specific value and, therefore, the setting of the level of the extracted signal attributable to the article itself can easily be performed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing embodiment the specific value of the level of the extracted signal attributable to the article itself has been automatically set to the level adjusting circuit 24 by inputting the kind of the articles through an external inputting operation, arrangement may be made that an operator inputs to the level adjusting circuit 24 the specific value of the level of the extracted signal attributable to the article itself for each kind of the articles so that it can be automatically set.

Accordingly, such changes and modifications are, unless they depart from the scope of the present invention as delivered from the claims annexed hereto, to be construed as included therein.

What is claimed is:

1. A foreign-matter detector for detecting foreign matter contained in articles of different kinds transported between a transmitter for generating a magnetic field and a receiver for receiving magnetic fluxes in the generated magnetic field, said detector comprising:

a signal extractor for extracting a signal having a predetermined phase difference relative to a transmitted signal from the transmitter, based on a phase of the transmitted signal from the transmitter and a received signal from the receiver, the transmitted signal being for generating the magnetic field and the received signal being induced by the magnetic fluxes;

a specific value setting unit for setting, through an external manual input operation, a specific value for the level of the extracted signal which is attributable to the articles free from foreign matter to be detected and is specified for each kind of the articles; and a level adjusting circuit for automatically adjusting the signal extractor or the receiver to cause the level of the extracted signal attributable to the articles to assume the specific value inputted based on a difference between the specific value and a predetermined fixed value lower than a level of determination of the foreign matter by which level the presence or absence of the foreign matter is determined.

2. The foreign-matter detector as claimed in claim 1, wherein said specific value setting unit comprises:

an item inputting unit for inputting the kind of articles;

a storage means storing specific values for the level of the extracted signal attributable to the article itself for each kind of the articles; and a specific value selecting means for reading from the storage means one of the specific values which corresponds to the kind of the articles inputted and for outputting such one of the specific values to the level adjusting circuit.

3. The foreign-matter detector as claimed in claim 1, wherein the level adjusting circuit is operable to perform at least adjustment of a detection sensitivity, out from adjustment of the phase of the transmitted signal in the signal extractor and adjustment of the detection sensitivity in the receiver, to thereby adjust the level of the extracted signal attributable to the articles.

4. The foreign-matter detector as claimed in claim 3, wherein the receiver includes a pair of receiving coils connected parallel to each other and disposed at respective locations where they receive an equal amount of the magnetic fluxes generated by the transmitter, and a differential amplifier for amplifying a difference between respective voltages generated in the receiving coils, said differential amplifier having an amplification factor that is adjusted by the level adjusting circuit.

5. A foreign-matter detecting system comprising:

a transport conveyor; and a foreign-matter detector for detecting foreign matter contained in articles of different kinds transported between a transmitter for generating a magnetic field and a receiver for receiving magnetic fluxes in the generated magnetic field, said detector comprising:

a signal extractor for extracting a signal having a predetermined phase difference relative to a transmitted signal from the transmitter, based on a phase of the transmitted signal from the transmitter and the received signal from the receiver, the transmitted signal being for generating the magnetic field and the received signal being induced by the magnetic fluxes;

a specific value setting unit for setting, through an external manual input operation, a specific value for the level of the extracted signal which is attributable to the articles free from foreign matter to be detected and is specified for each kind of the articles; and a level adjusting circuit for automatically adjusting the signal extractor or the receiver to cause the level of the extracted signal attributable to the article itself to assume the specific value inputted based on a difference between the specific value and a predetermined fixed value lower than a level of determination of the foreign matter by which level the presence or absence of the foreign matter is determined wherein, the foreign-matter detector detects the presence or absence of the foreign matter contained in the articles being transported by the transport conveyor.

6. A foreign-matter detector as defined in claim 2, wherein the foreign matter detector detects the presence or absence of foreign matter contained in the articles being transported by a transport conveyor.

7. A foreign-matter detector as defined in claim 3, wherein the foreign matter detector detects the presence or absence of foreign matter contained in the articles being transported by a transport conveyor.

8. A foreign-matter detector as defined in claim 4, wherein the foreign matter detector detects the presence or absence of foreign matter contained in the articles being transported by a transport conveyor.

9. A foreign-matter detecting system as claimed in claim 5, wherein said specific value setting unit comprises:

an item inputting unit for inputting the kind of articles;

a storage means storing specific values for the level of the extracted signal attributable to the article itself for each kind of the articles; and a specific value selecting means for reading from the storage means one of the specific values which corresponds to the kind of the articles inputted and for outputting such one of the specific values to the level adjusting circuit.

10. A foreign-matter detecting system as claimed in claim 5, wherein the level adjusting circuit is operable to perform at least adjustment of a detection sensitivity, out from adjustment of the phase of the transmitted signal in the signal extractor and adjustment of the detection sensitivity in the receiver, to thereby adjust the level of the extracted signal attributable to the articles.

11. A foreign-matter detecting system as claimed in claim 10, wherein the receiver includes a pair of receiving coils connected parallel to each other and disposed at respective locations where they receive an equal amount of the magnetic fluxes generated by the transmitter, and a differential amplifier for amplifying a difference between respective voltages generated in the receiving coils, said differential amplifier having an amplification factor that is adjusted by the level adjusting circuit.

12. A foreign-matter detector comprising:
   a signal extractor extracting a signal having a predetermined phase difference relative to a transmitted signal from a transmitter, based on a phase of the transmitted signal from the transmitter and a received signal from a receiver, the transmitted signal being for generating a magnetic field and the receiving signal being induced by magnetic fluxes in the generated magnetic field;
   a specific value setting unit setting, through an external input manual operation, a specific value for the level of the extracted signal which is attributable to articles free from foreign matter to be detected and is specified for each kind of the articles; and
   a level adjusting circuit automatically adjusting the signal extractor or the receiver to cause the level of the extracted signal attributable to the articles to assume the specific value inputted based on a difference between the specific value and a predetermined fixed value lower than a level of determination of the foreign matter by which level the presence or absence of the foreign matter is determined.

13. The foreign-matter detector as claimed in claim 12, wherein said specific value setting unit comprises:
   an item inputting unit inputting the kind of articles;
   a storage unit storing specific values for the level of the extracted signal attributable to the article itself for each kind of the articles; and
   a specific value selecting unit reading from the storage unit one of the specific values which corresponds to the kind of the articles inputted and outputting such one of the specific values to the level adjusting circuit.

14. The foreign-matter detector as claimed in claim 12, wherein the level adjusting circuit is operable to perform at least adjustment of a detection sensitivity, out from adjustment of the phase of the transmitted signal in the signal extractor and adjustment of the detection sensitivity in the receiver, to thereby adjust the level of the extracted signal attributable to the articles.

15. The foreign-matter detector as claimed in claim 14, wherein the receiver includes a pair of receiving coils connected parallel to each other and disposed at respective locations where they receive an equal amount of the magnetic fluxes generated by the transmitter, and a differential amplifier amplifying a difference between respective voltages generated in the receiving coils, said differential amplifier having an amplification factor that is adjusted by the level adjusting circuit.

16. A foreign-matter detector as defined in claim 13, wherein the foreign matter detector detects the presence or absence of foreign matter contained in the articles being transported by a transport conveyor.

17. A foreign-matter detector as defined in claim 14, wherein the foreign matter detector detects the presence or absence of foreign matter contained in the articles being transported by a transport conveyor.

18. A foreign-matter detector as defined in claim 15, wherein the foreign matter detector detects the presence or absence of foreign matter contained in the articles being transported by a transport conveyor.

19. A foreign-matter detecting system comprising:
   a transport conveyor; and
   a foreign-matter detector, said detector comprising:
      a signal extractor extracting a signal having a predetermined phase difference relative to a transmitted signal from a transmitter, based on a phase of the transmitted signal from the transmitter and a received signal from a receiver, the transmitted signal being for generating a magnetic field and the receiving signal being induced by magnetic fluxes in the generated magnetic field;
      a specific value setting unit setting, through an external manual input operation, a specific value for the level of the extracted signal which is attributable to articles free from foreign matter to be detected and is specified for each kind of the articles; and
      a level adjusting circuit automatically adjusting the signal extractor or the receiver to cause the level of the extracted signal attributable to the article to assume the specific value inputted based on a difference between the specific value and a predetermined fixed value lower than a level of determination of the foreign matter by which level the presence or absence of the foreign matter is determined wherein, the foreign-matter detector detects the presence or absence of the foreign matter contained in the articles being transported by the transport conveyor.

* * * * *